No. 737,421. Patented August 25, 1903.

UNITED STATES PATENT OFFICE.

AXEL KREFTING, OF CHRISTIANIA, NORWAY, ASSIGNOR TO ERNEST HERRMANN, OF PARIS, FRANCE.

PROCESS OF EXTRACTING GLUTINOUS SUBSTANCES FROM SEAWEED.

SPECIFICATION forming part of Letters Patent No. 737,421, dated August 25, 1903.

Application filed May 19, 1902. Serial No. 108,090. (No specimens.)

*To all whom it may concern:*

Be it known that I, AXEL KREFTING, a subject of the King of Sweden and Norway, and a resident of Christiania, Norway, (whose postal address is Bygdö Allé No. 21, Christiania, Norway,) have invented certain new and useful Improvements in Continuous Processes for Extracting Glutinous Substances from Seaweed, of which the following is a full and complete specification, such as will enable those skilled in the art to which it pertains to make and use the same.

The objects of my invention are a method of extracting a glutinous substance by, first, dissolving seaweed in a solution of carbonate of soda and filtering the liquid, which is what I call "tangate of soda"—that is to say, the salt formed by the acid of the seaweed, which I call "tangic" acid, and the carbonate of soda; secondly, add gradually to the said solution of tangate of soda a milk of lime or lime-water, which precipitates a tangate of lime, which I separate from the liquids by filtration; thirdly, drying the said tangate of lime and mixing it with carbonate of soda, then powdering these substances together, so as to form a glutinous soluble material; fourthly, drying the liquid from which the tangate of lime was precipitated and which contains soda with a stream of carbonic acid, which regenerates the carbonate of soda, so that the same solution serves again to dissolve a fresh quantity of seaweed.

The full and complete specification of my method of extracting a glutinous substance from seaweed by a continuous process in which the same regenerated solution of carbonate of soda is employed throughout is as follows:

This invention relates to the treatment of seaweed by a continuous process in which the carbonate of soda employed for the above-mentioned solution is regenerated and can be used afresh and to the extraction of a glutinous substance in the form of a dry white powder, which is soluble in hot or cold water. This powder, which can be easily conveyed from one place to another, may be employed in several branches of industry, especially the dressing of textile materials, the sizing of yarns, the manufacture of paper, the mixing of size-colors, &c.

The operation is carried out in the following manner: One thousand kilograms of fresh seaweed corresponding to about three hundred kilos of seaweed dried in the air are dissolved in ten thousand liters of a one-per-cent. solution of carbonate of soda. The whole is filtered in order that the solution of "tangate of soda" thus obtained may be clarified. By "tangate of soda" I mean the salt formed by the acid of the seaweed with the soda-salt. This product is already known. (See Axel Krefting, United States Patent No. 598,790, of November 21, 1896.) It has nevertheless been specified, as it forms the indispensable starting-point of the operation decribed below in detail. The chemical equations and formulæ of these products, which are all of my invention, are as follows:

Tangic acid $= C_{13}H_{20}O_{14}$.

Tangate of soda $= C_{13}H_{16}O_{14}Na_4$.

Tangate of lime $= C_{13}H_{16}O_{14}Ca_2$.

This solution of tangate of soda is precipitated by means of milk of lime or lime-water, which is added gradually in small quantities until the precipitation is completed. In this manner an insoluble tangate of lime is obtained and is separated by filtration from the liquid, which then contains hydrate of soda in solution. The tangate of lime is dried in a lumpy state and mixed with twenty per cent. of its weight of powdered carbonate of soda. The whole is pulverized, and thus the dried powder which is soluble in water and forms the object of the process is obtained.

In order to dilute the slaked lime, which serves for making milk of lime or lime-water in the following operation, a small quantity of the liquid resulting from the filtration of the tangate of lime is used, so as to avoid the addition of any further water. The other portion of the filtration liquid—that is to say, nearly the whole—is treated with a stream of carbonic acid, which transforms the soda into carbonate of soda, thus regenerated, and the lime into carbonate of lime, which is precipitated. The liquid is poured off and a fresh corresponding quantity of seaweed is dissolved with the solution of the regenerated carbonate of soda.

Having now described my invention, what I claim as new, and desire to secure by Letters Patent, is—

1. A process for extracting the glutinous matter of seaweed in the form of insoluble tangate of lime, consisting in precipitating a solution of seaweed in carbonate of soda by means of milk of lime separating the tangate of lime from the liquid by filtration, drying the same in lumps, mixing these lumps with twenty per cent. of dry carbonate of soda and pulverizing the mixture.

2. A process for extracting the glutinous matter of seaweed in the form of insoluble tangate of lime, consisting in precipitating a solution of seaweed in carbonate of soda by means of milk of lime separating the tangate of lime from the liquid by filtration, then introducing a stream of carbonic acid into said liquid to regenerate the carbonate of soda contained in the said liquid and using the solution for dissolving a fresh quantity of seaweed, substantially as described.

In witness whereof I have hereunto set my hand in presence of two witnesses.

AXEL KREFTING.

Witnesses:
M. ALGER,
CH. NEULAKE.